Oct. 23, 1962 A. WOODS 3,059,401
TOBACCO LEAF HARVESTER
Filed Jan. 18, 1961 7 Sheets-Sheet 1

Fig.1

Allen Woods
INVENTOR.

BY *Clarence A. O'Brien*
*and Harvey B. Jacobson*
Attorneys

Allen Woods
INVENTOR

Allen Woods
INVENTOR.

Oct. 23, 1962    A. WOODS    3,059,401
TOBACCO LEAF HARVESTER
Filed Jan. 18, 1961    7 Sheets-Sheet 7

Allen Woods
INVENTOR.

though a plane indicated by section line 3—3 of FIG-
United States Patent Office 3,059,401
Patented Oct. 23, 1962

3,059,401
TOBACCO LEAF HARVESTER
Allen Woods, Lexington, Ky., assignor of ten percent to Joseph Hill, Louisville, Ky., twenty percent to Ray Holbrook and nineteen percent to James P. Hanrahan, both of Frankfort, Ky.
Filed Jan. 18, 1961, Ser. No. 83,555
16 Claims. (Cl. 56—27.5)

The present invention relates to a machine for harvesting a tobacco crop.

The harvest of a tobacco crop involves cutting of the tobacco plant at the ground level and placing a predetermined number of tobacco plants in spaced relation on a tobacco stick so that the tobacco plants so harvested may be stored and suspended from the stick in a barn for curing purposes. While there is no particular problem in cutting of the tobacco plant stalk for harvesting purposes, considerable difficulty has heretofore been encountered in connection with automatic types of harvesting machines, in securing the tobacco plant at their stalks in spaced relation on the stick from which they are hung for storing purposes. Harvesting machines have heretofore been designed which employ extremely complicated and expensive equipment for mounting of the tobacco plant on the tobacco stick after cutting thereof. Such harvesting machines in addition to being expensive and subject to frequent breakdown by virtue of the complexity of its mechanism, also cause bruising of and damage to the tobacco leaves of the plants harvested. It is therefore a primary object of this invention to provide a machine of such novel and useful design that the more complicated and expensive mechanism of tobacco harvesting machines heretofore used is eliminated and a more economical machine made available which will also automatically secure the tobacco plants in spaced relation upon a tobacco stick without manual manipulation or damage to the tobacco leaves of the plants.

Another object of this invention is to provide a tobacco harvesting machine capable of being pulled by a tractor and/or powered thereby to gently receive the tobacco plants, cut them at the stalk level, spear a predetermined number of tobacco plants onto tobacco sticks in equal spaced relation to each other and periodically present such sticks in an automatic fashion to enable removal of loaded sticks for direct storing purposes.

An additional object of this invention is to provide a tobacco harvesting machine in which a plurality of tobacco stick holders are periodically indexed into position for receiving tobacco plants thereon, the indexing of the tobacco stick holders being accomplished by a novel intermittent drive mechanism under control of a plant counter wheel so as to index the tobacco stick holders only after a predetermined number of tobacco plants are received therewithin.

A further object of this invention is to provide a tobacco harvesting machine embodying the novel indexing mechanism heretofore mentioned and also including a novel tobacco plant spacing mechanism which space the tobacco plants on the tobacco stick in equally spaced relation to each other.

A still further object of this invention is to provide a tobacco harvesting machine employing the novel indexing and spacing mechanism heretofore mentioned and tobacco stick holder devices whereby the plants are harvested with minimum displacement of the plants from their vertical position when cut and without any damage to the tobacco leaf of the plant by virtue of the novel manner in which the plants are harvested and prepared for storing mounted on the tobacco stick.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
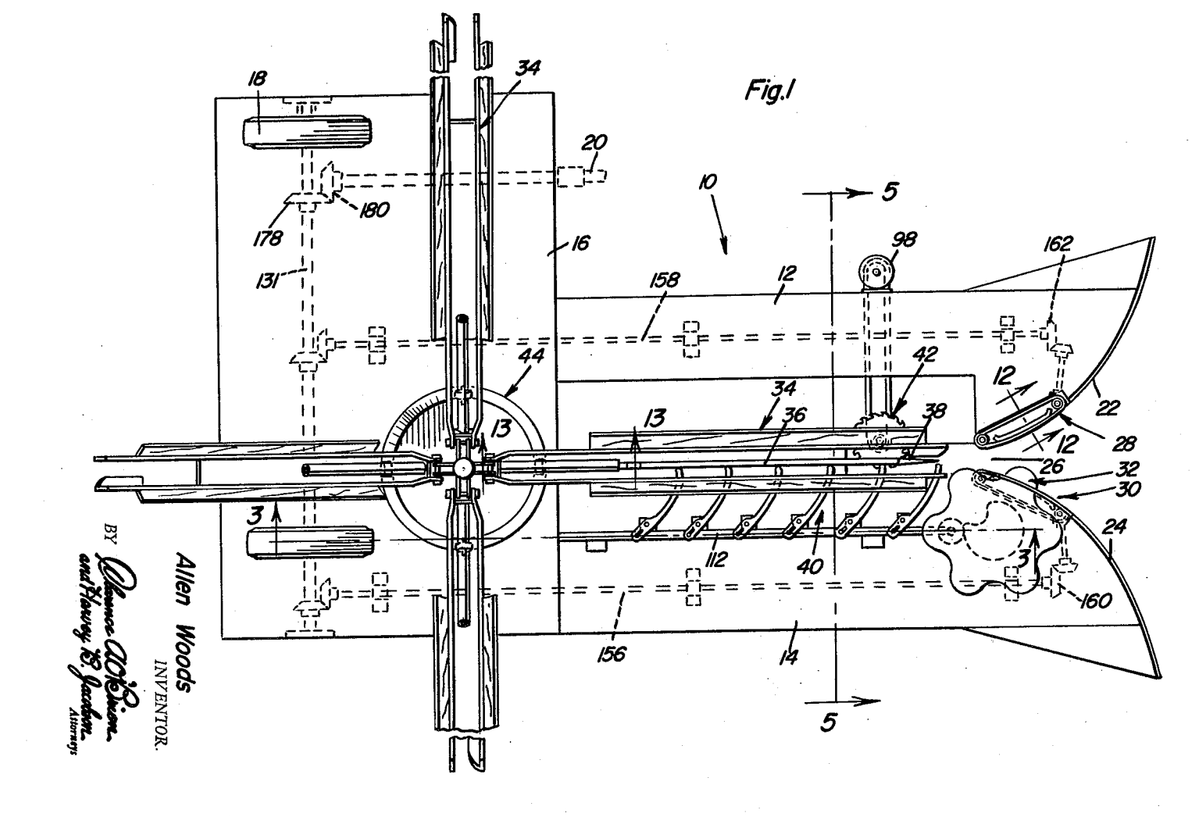
FIGURE 1 is a top plan view of the tobacco harvesting machine made in accordance with this invention.

Referring now to the drawings in detail, FIGURE 1 illustrates most completely a general view of the tobacco harvesting machine which is generally referred to by reference numeral 10. It will be observed that the harvesting machine 10 is embodied in a vehicle frame structure having two parallel forwardly extending portions 12 and 14 which project forwardly from a laterally extending frame portion 16. It will therefore be apparent that the space disposed laterally of the portion 12 and forwardly of the lateral extending part of portion 16 will accommodate the tractor vehicles with which the harvesting machine 10 is used, the tractor vehicle accordingly pulling the harvest machine 10 forwardly through the field. Power for driving the various mechanisms of the machine as will be hereafter described in greater detail, is derived either from the rotational movement imparted to the wheels 18 which support the vehicle frame or alternatively the wheels 18 may be loosely mounted in which case the power for driving the machine mechanism will be derived from a power take-off 20 connected to the tractor.

Figure 2:
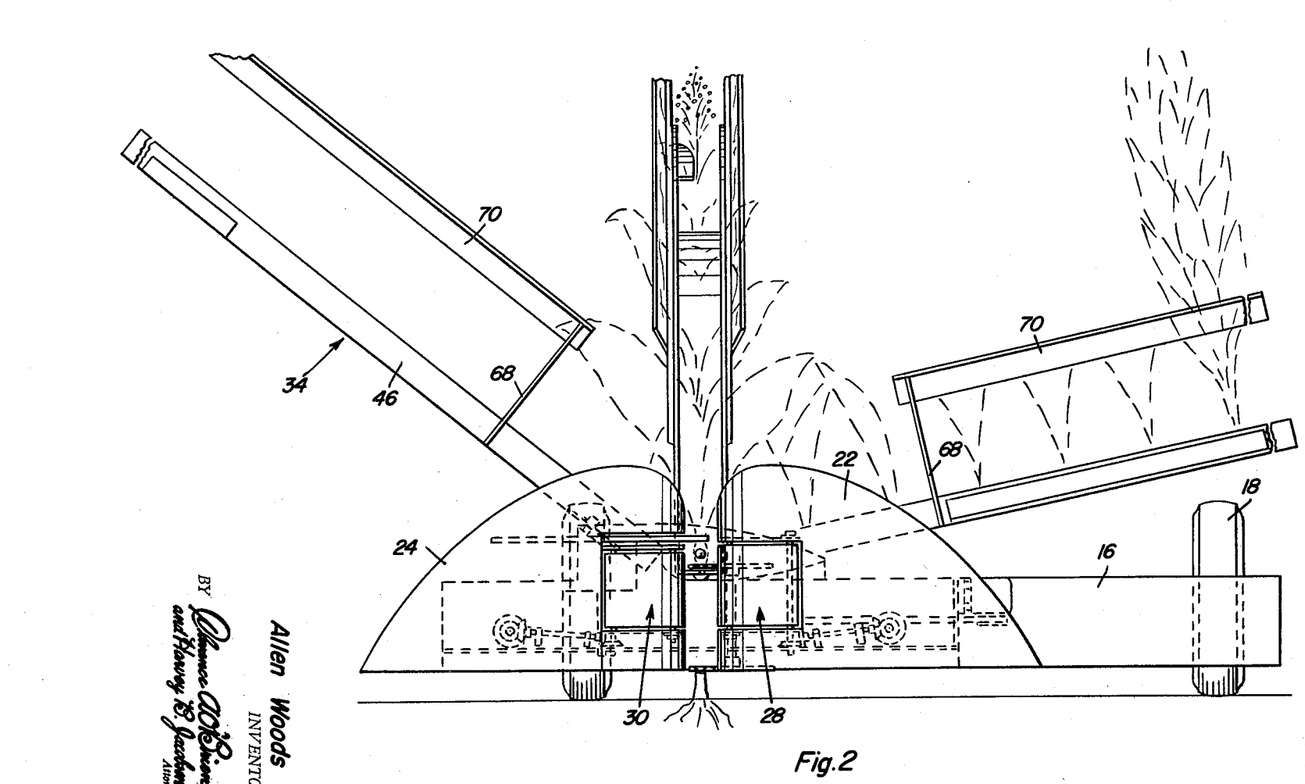
FIGURE 2 is a front elevational view of the tobacco harvesting machine illustrated in FIGURE 1.
Figure 3:
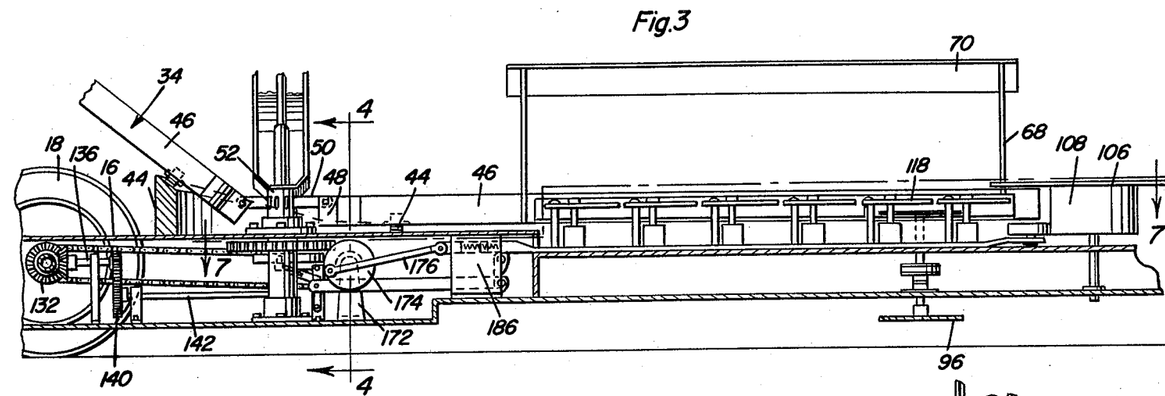
FIGURE 3 is a sectional view taken substantially through a plane indicated by section line 3—3 of FIGURE 1.

Referring now to FIGURES 1 and 2 it will be observed that the forward ends of the frame portion 12 and 14 mount a pair of plant guide members 22 and 24 which are disposed in spaced relation above the ground a short distance and converge rearwardly of the machine into a narrow guideway for receiving and guiding the tobacco plants into the harvesting machine. Accordingly, the guideway 26 formed by the rearward portions of the guide member 22 and 24 will be aligned with a row of tobacco plants as the machine 10 moves forwardly through the tobacco field. Disposed rearwardly of the guide members 22 and 24 are a pair of endless moving belt guide mechanisms 28 and 30 which move rearwardly with respect to the machine frame portions for the purpose of gently guiding the plant into the narrow guideway 26. As the plants pass through the guideway 26, they engage and are counted by a counter mechanism generally referred to by reference numeral 32. The plants then enter within a tobacco stick holder device 34 which is in alignment with the guideway 26. Disposed within the holder device 34 is a tobacco stick 36 having a spear end 38 by means of which the stalks of the plants are speared and received on the stick 36. A spacer mechanism generally referred to by reference numeral 40 pushes the plant rearwardly of the stick 36 in equally spaced relation to each other. As the plants pass rearwardly with respect to the holder device 34, the stalks are cut by a saw mechanism 42 disposed beneath the frame portion 12 of the machine and extending therebeyond into the holder device 34. After six tobacco plants are disposed on the tobacco stick of the holder device 34 aligned with the guideway 26, an indexing mechanism under control of the counter mechanism 32 and operatively connected with the spacer mechanism, rotates the tobacco stick holder devices 90 degrees so as to bring for example the next holder device, of the four holder devices illustrated, into alignment with the guideway 26. The loaded holder device indexed away from alignment with the guideway 26 may then be relieved of the plant mounted tobacco stick 36 and replaced by an empty tobacco stick for subsequent harvesting of tobacco plants. When the tobacco stick holder devices are in their inoperative position out of alignment with the guideway 26, by virtue of their hinged connection to the indexing mechanism and cooperation with a cam device 44, they will be disposed in an upwardly inclined position as more clearly seen in FIGURE 2.

Referring now to FIGURES 2, 3, 13 and 15, it will be observed that each of the holder devices 34 includes a channel member 46 one end of which has a pair of pivot ear projections 48 which hingedly connect the channel member 46 to a plurality of arms 50 which project radially from a rotor 52 through which the holder devices 34 are indexed. A longitudinal slot 58 is disposed on one side and bottom of the channel member 46 adjacent the forward end thereof for the purpose of accommodating the spacer mechanism 40 heretofore mentioned which will be described with greater detail hereafter. A slot 60 is also disposed on the opposite side wall of the channel member 46 adjacent the forward end thereof for the purpose of accommodating the saw mechanism 42. As more clearly seen in FIGURE 13, the bottom of the channel member 46 adjacent the rear hinge portion rotatably mounts a roller 62 for rotatably guiding the holder device 34 over the cam surface of the cam device 44 fixedly mounted on top of the vehicle frame portion 16. It will therefore be apparent that as the rotor 52 rotates the holder device 34 into a position in alignment with the plant guideway 26, the holder device 34 will be in a horizontal position. In the other positions of the holder devices 34, the cam 44 will position them in a vertically inclined out-of-the-way position. It will also be noted from FIGURE 13, that connected to the rear portion of the holder channel member 46 is a forwardly projecting tubular member 64 which receives the rear end of the tobacco sticks 36 and also carries a spring element 66 for biasing the tobacco stick 36 forwardly against the pressure imposed thereon when the spear portion 38 of the stick 36 spears the stalk of the tobacco plants. From FIGURES 2 and 5, it will also be observed that each of the holder devices has a plurality of arms 68 which project upwardly from the sides thereof and which mount in spaced relation above the channel member 46 a pair of longitudinally extending and outwardly diverging support members 70 which are adapted for gently supporting the tobacco leaves of the cut plant being carried by the holder devices 34.

Figure 5:
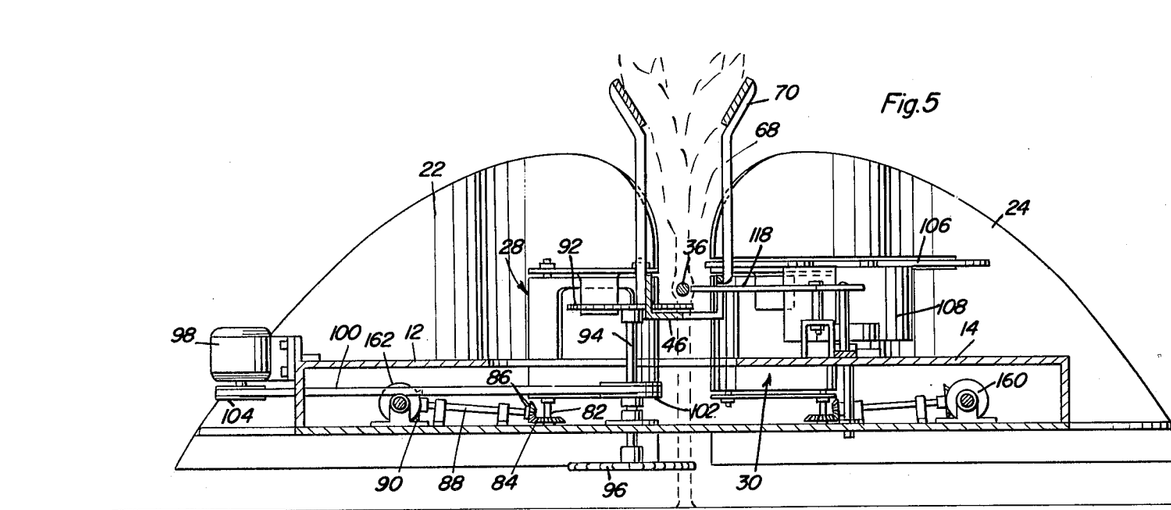
FIGURE 5 is a sectional view taken through a plane indicated by section line 5—5 in FIGURE 1.
Figure 12:
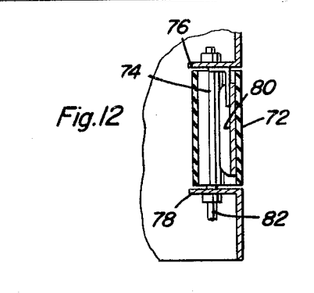
FIGURE 12 is a sectional view taken through a plane indicated by section line 12—12 in FIGURE 1.
Figure 13:
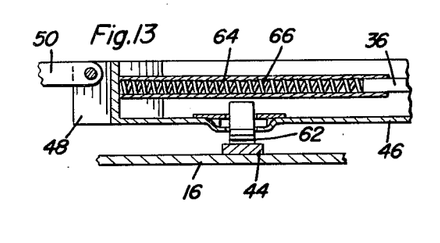
FIGURE 13 is a sectional view taken substantially through a plane indicated by section line 13—13 in FIGURE 1.
Figure 15:
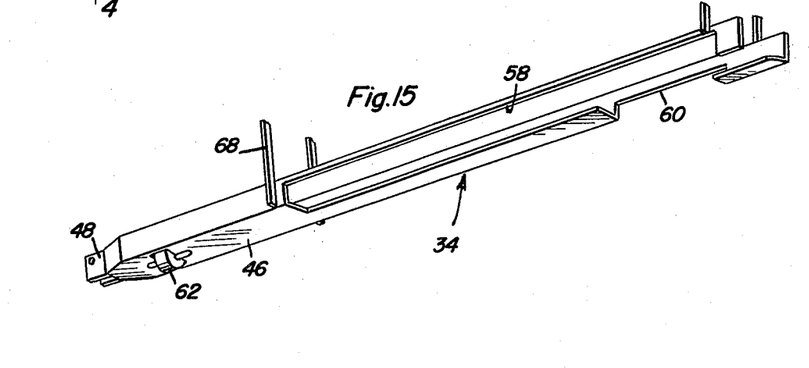
FIGURE 15 is a partial perspective view of the tobacco stick holder device.

Referring now to FIGURES 1 and 5 in particular, it will be observed that as these plants are received within the guideway 26, any plant stalk that may be misaligned in the plant row will be gently guided into the guideway by the moving belt mechanisms 28 and 30. Each of the belt mechanisms is of identical construction and include an endless belt 72 which is trained about a pair of rollers one of which is a drive roller 74 as more clearly seen in FIGURE 12. The drive roller as well as the other roller are rotatably mounted by means of an upper and lower inwardly projecting flange 76 and 78. Also a belt guide member 80 is fixedly attached to the upper flange 76 and disposed behind and against the exposed belt run for the purpose of guiding the belt for contact with misaligned plant stalks. It will also be observed from FIGURE 5, that the drive roller 34 is connected to a drive shaft 82 which extends therebelow and to which a bevel gear 84 is connected. The bevel gear 84 meshes with a bevel gear 86 connected to the end of a horizontal shaft 88 rotatably mounted within the forwardly extending frame portion. The shaft 88 has connected thereto at the opposite end, a bevel gear 90 through which the power drive for the belt mechanism 28 or 30 is provided as will be hereinafter explained with greater detail.

Disposed rearwardly of the belt mechanism 28 and rotatably mounted by the frame portion 12 is the saw mechanism 42. The saw mechanism includes an upper rotary saw blade 92 connected to the upper end of a vertical shaft 94 which was connected to the lower end thereof a lower saw blade 96. Accordingly, upon rotation of the shaft 90 together with the saw blades 92 and 96, a plug will be cut from the tobacco plant stalk so that not only will the tobacco plant be free to move rearwardly of the stick 36 speared therethrough by virtue of the disposition of the upper rotary saw blade 92 within the channel member 46 of the holder device but the machine will also be cleared of the stalk stubbles by virtue of the cutting of the stalk below the machine by the lower rotary saw blade 96. Power for rotating the saw blade is provided by a motor device 98 mounted on the side of the frame portion 12 and drivingly connected to the shaft 94 by the drive belt 100 which is entrained about the pulley 102 fixed to the shaft 94 and the pulley 104 driven by the motor 98.

Figure 7:
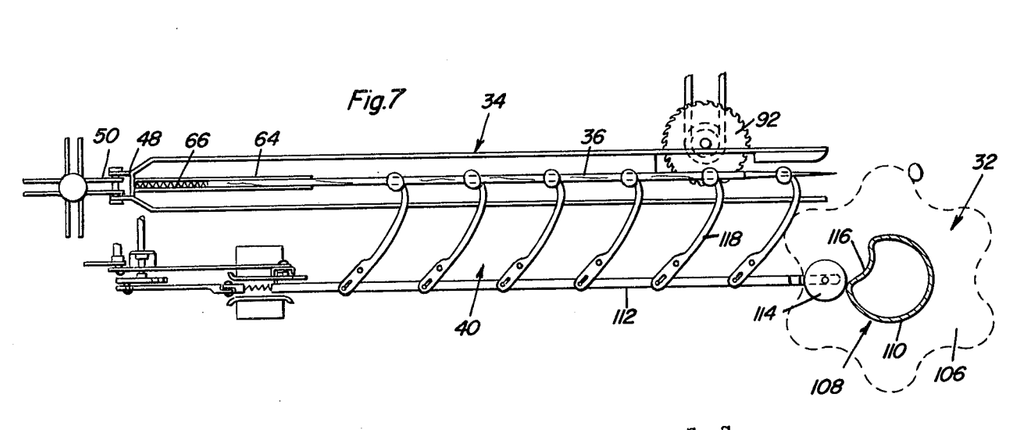
FIGURE 7 is a sectional view taken substantially through a plane indicated by section line 7—7 in FIGURE 3 showing the harvesting machine in a non-indexing condition.
Figure 8:
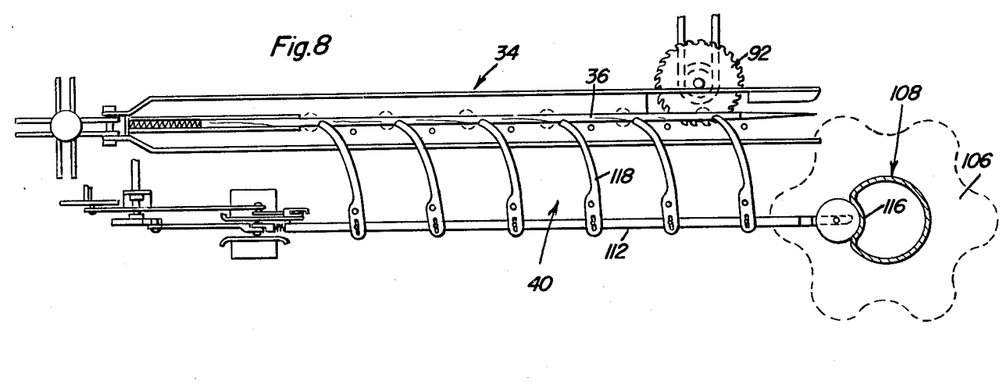
FIGURE 8 is a sectional view similar to that of FIGURE 7 but showing the harvesting machine in an indexing condition.

Referring now to FIGURES 7 and 8 in particular, it will be observed that the stalks as they enter the holder device 34 will be speared by the stick 36 but pass by a projection on the counter wheel 106 which is rotatably mounted by the frame portion 14 with the projections thereof projecting beyond the belt mechanism 30, into the path of the plant stalks moving relative to the machine. Accordingly, as each plant stalk passes the counter wheel 106, the wheel will be angularly displaced a predetermined amount. Connected to the counter wheel and disposed therebelow is a rotary cam member 108 which includes a circular portion 110 defining a stroke limiting surface for the reciprocating rod member 112 the forward end of which has the roller element 114 for engaging the surface 110 of the cam member 108 to limit the reciprocatory stroke of the member 112. The cam member 108 also includes a recess portion 116 which is rotated to a position in alignment with the roller element 114 of the reciprocatory rod member 112 every time the counter wheel 106 is angularly displaced six times by six plants passing thereby. When the recess portion 116 of the cam 108 is so aligned a longer stroke for the rod 112 is provided for whereby the indexing mechanism is actuated for indexing the holder devices 90° as will be hereafter explained in greater detail. However, between indexing of the holder devices, the rod member 112 will be reciprocated through a stroke determined by the surface 110 on the cam member 108. Accordingly, pivotally mounted by the frame portion 14 are a plurality of spacing finger members 118 one end of which is connected to the rod member 112 by a pin and slot connection while the other ends thereof engage the stalks of the tobacco plant. Reciprocation of the rod member 112 will therefore cause the spacing finger members 118 to be pivoted in a counterclockwise direction as viewed in FIGURES 7 and 8 causing shift of the stalks rearwardly on the stick 36. It will therefore be apparent that the stalks after being speared onto the stick 36 will be shifted rearwardly thereof by equal amounts until six plants are disposed along the stick 36 at which time the cam member 108 will permit the rod 112 to undergo a longer stroke which in turn causes the indexing mechanism to index the holder device 34 a predetermined angular distance.

Figure 4:
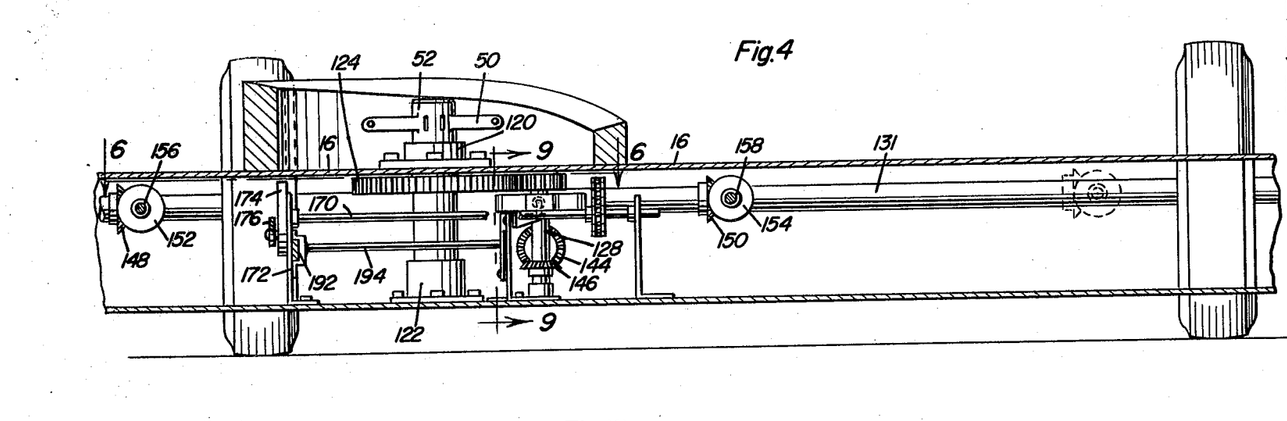
FIGURE 4 is a sectional view taken substantially through a plane indicated by section line 4—4 in FIGURE 3.
Figures 6, 9, 14:
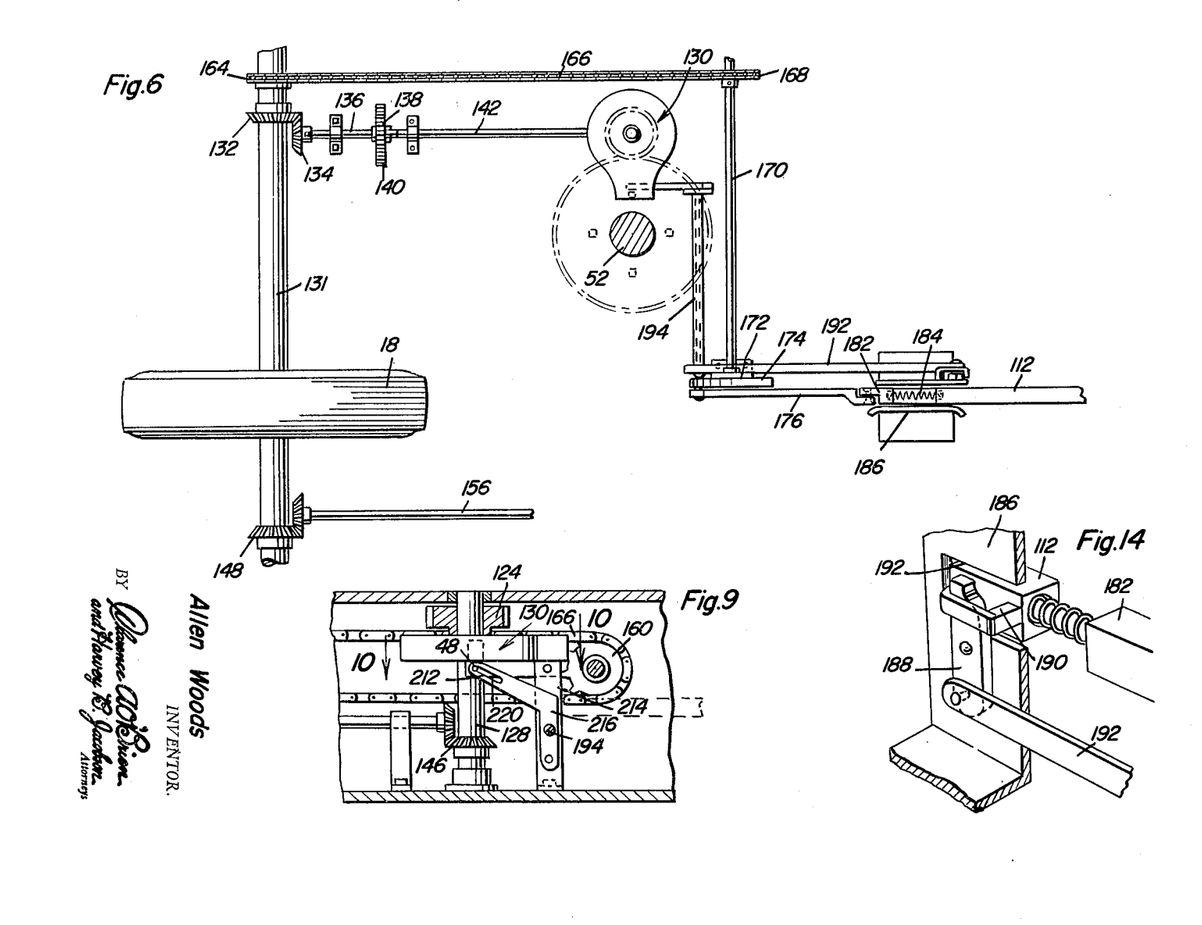
FIGURE 6 is a sectional view taken substantially through a plane indicated by section line 6—6 in FIGURE 4.
FIGURE 9 is a partial sectional view taken substantially through a plane indicated by section line 9—9 of FIGURE 4.
FIGURE 14 is a partial perspective view of the indexing stroke mechanism.

Referring now to FIGURES 4, 6, and 9, it will be observed that the rotor 52 which projects above the frame portion 16 is rotatably mounted by a pair of bearing assemblies 120 and 122 disposed above the frame portion 16 and within the frame portion. Connected to the rotor 52 below the bearing assembly 120 is a driven gear 124. The driven gear 124 meshes with a drive gear 126 which is periodically connected to the drive shaft 128 by means of the indexing clutch mechanism generally referred to by reference numeral 130, for the purpose of indexing the rotor 52 and the holder devices 34 connected thereto. In order to impart drive to the shaft 128, the main drive shaft 131 to which the wheels 18 are connected, is drivingly connected to the shaft 128 by means of a bevel gear 132 fixed to shaft 131 meshing with a bevel gear 134 fixed to one end of a shaft 136 to which a spur gear 138 is connected for mesh with a gear 140 which in turn drives shaft 142 to which bevel gear 144 is connected. The bevel gear 144 accordingly meshes with the bevel gear 146 connected to the drive shaft 128 for driving the gear 126 when the indexing clutch mechanism 130 is rendered effective. The foregoing drive train will be apparent from FIGURES 3, 4 and 6. It will also be observed that the main drive shaft 131 has connected thereto a pair of bevel gears 148 and 150 disposed on opposite sides of the drive mechanism to the indexing clutch mechanism, for the purpose of meshing with bevel gears 152 and 154 to which the drive shafts 156 and 158 are connected. The drive shafts as more clearly shown by dotted line in FIGURE 1 extend forwardly into the forward portion 12 and 14 of the vehicle frame and have connected to the forward ends thereof the bevel gears 160 and 162 through which the belt mechanism 28 and 30 are driven. Also, connected to the main drive shaft 131 adjacent to the bevel drive gear 132 as more clearly seen in FIGURE 6, is a sprocket gear 164 which is drivingly connected by endless sprocket chain 166 to the sprocket gear 168 connected to the drive shaft 170. The drive shaft is rotatably mounted by a bracket member 172 and has connected to the end of the shaft 170 projecting therebeyond a crank disk member 174 through which connecting rod 176 is pivotally connected for the purpose of imparting the reciprocatory stroke to the reciprocatory rod member 112 to which the spacer fingers 118 are operatively connected. Accordingly, power drive is provided for reciprocating the spacing mechanism 40 in timed relation to forward movement of the harvesting machine by virtue of the rotation of the wheels 18 whereof which are connected to the main drive shaft 131. Also, power drive is provided for the holder device rotor 52 when the indexing clutch mechanism 130 is rendered effective. Alternatively, the main drive shaft 131 may be driven by the power take-off 20 from the tractor through the bevel gears 178 and 180 as shown by dotted line in FIGURE 1.

Referring now to FIGURES 6 and 14 particularly, it will be observed that the connecting rod 176 driven by the crank disk member 174 will impart a reciprocatory stroke to the rod member 112 by means of an element 182 pivotally connected to the forward end of the connecting rod 176 which is operatively connected to the rear end of the reciprocatory rod member 112 by means of the spring mechanism 184. The spring connection is slidably guided within a guide assembly 186. Inasmuch as the connecting rod 176 is resiliently connected to the member 112 by the spring mechanism, it will be apparent that the stroke imparted to the reciprocatory member 112 will be defined by the surfaces on the cam 108 connected to the counter wheel 106 of the counter mechanism 32. Accordingly, as the main drive shaft 131 is rotated, the member 112 will be reciprocated in timed relation thereto in order to oscillate the spacing fingers 118 a predetermined amount for rearwardly shifting the plant stalks on the stick 36. When however the recess 116 of the cam 108 defines a longer stroke for the member 112, the rear end of the member 112 engages a lever member 188 which is pivotally mounted on the side of the guide assembly 186. Engagement of the lever member 188 is effected by means of a laterally projecting arm 190 connected at the rear end of the member 112 on the spring mechanism and extending through a slot 192 in the guide assembly 186 (FIG. 14). During the stalk spacing stroke of the member 112, it will be appreciated that the projecting arm 190 will not engage the lever member 188. However, during the indexing stroke which occurs after every six spacing strokes by virtue of the action of the counter mechanism 32, the projection 190 on the spring mechanism engages the lever 188 and thereby causes rearward shift of the connecting member 192 which is pivotally connected to the lower end of the lever member 188. The connecting member 192 which is slidably guided by the mounting bracket 172 for the disk shaft 170, is connected to a rod member 194 which extends perpendicular to the connecting member 192 rearwardly thereof. The rod member 194 at its opposite end is operatively connected to the indexing clutch mechanism for the purpose of rendering it effective on rearward displacement of the rod member 194 by the connecting member 192 which occurs by virtue of the longer indexing stroke of the reciprocatory member 112.

Figure 10:
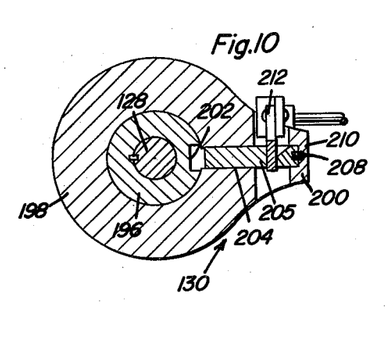
FIGURE 10 is a sectional view taken through a plane indicated by section line 10—10 in FIGURE 9, showing the indexing clutch mechanism in a non-indexing condition.
Figure 11:
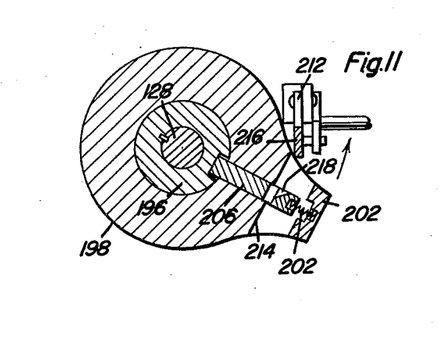
FIGURE 11 is a sectional view similar to that of FIGURE 10 but showing the clutch mechanism during indexing operation.

Referring now to FIGURES 9, 10 and 11 it will be observed that the indexing clutch mechanism 130 as seen in FIGURE 10 includes an inner clutch member 196 splined to the driveshaft 128. Rotatably mounted relative to the inner clutch member 196 is the outer clutch member 198 which has a radial projecting portion 200. A slot 202 is formed within the inner clutch member 196 in alignment with a radial slot 204 disposed within the radial portion 200 of the outer clutch member 98. It will also be observed from FIGURE 10, that slidably disposed within the slot 204 is a clutch pawl member 206 which is biased radially inward toward the slot 202 in the inner clutch member 196 for clutch engagement purposes by a spring 208 seated within a recess 210. The clutch pawl member 206 is however held in retracted position as illustrated in FIGURE 10 by a lever member 212 pivotally connected to the upper ends of a pivot bracket member 214 fixed to the vehicle frame In order to index the rotor 52, it will be necessary to permit the clutch mechanism 130 to be engaged. Accordingly, in order to effect engagement of the pawl 206, the lever member 212 is withdrawn by pivoting thereof downwardly as viewed in FIGURE 9 by means of a clutch release lever 216 which is pivotally connected at its lower end to the bracket member 214 with the upper end thereof being connected to the clutch disengaging lever 212 by means of the pin 218 and slot 220. It will be observed therefore, that the rod member 194 is connected to the clutch release lever 216 and will cause it to pivot downwardly or counterclockwise as viewed in FIGURE 9 in response to rearward displacement of the connecting member 192 to which the rod member 194 is connected, when the stroke of the spacing mechanism 40 is increased by the aforementioned action of the counter mechanism.

32. It will therefore be apparent that with counterclockwise movement of the lever 212 as viewed in FIGURE 9, the clutch mechanism 130 will be engaged by virtue of the biasing of the pawl member 206 into engagement with the inner clutch member 196 The gear member 126 which is connected to the outer clutch member 198 will accordingly execute one revolution which by virtue of the gear drive ratio to the gear 124 causes the rotor 52 for the holder devices to execute a 90° movement. During the one revolution of the outer clutch member 198, the clutch disengaging lever 212 will have returned to its horizontal or upright position so that as the radially projecting portion 200 of the outer clutch member 198 approaches the clutch release lever 212 as seen in FIGURE 11, the slotted portion 215 thereof will move over the upper end of the lever 212 and will subsequently engage within the bevel slot 219 in the pawl member 206 causing the pawl member 206 to be retracted against the bias of the spring 208 to thereby disengage the clutch mechanism 130. It will therefore be apparent that the clutch mechanism 130 will intermittently drive the gear 126 one revolution following each six strokes imparted to the member 112 in order to index the holder device 34 after six tobacco plant stalks are spaced on the tobacco sticks disposed within the holder devices.

Operation and utility of the tobacco harvesting machine will therefore be apparent from the foregoing description. It will therefore be appreciated, that the harvesting machine of the present invention cuts and spaces the cut tobacco plants on the tobacco stick for storing purposes in a novel manner avoiding the complicated tying mechanisms of tobacco harvesting machines heretofore known. Furthermore, by virtue of the novel counting mechanism, spacing mechanism and indexing clutch mechanism of the present invention which are all coordinated to cooperate in timed relation to the main drive shaft rotation, efficient harvesting of the tobacco plants is accomplished Also, the harvesting is performed without damage or bruising to the tobacco plants which remain in a substantially upright position throughout and are carried in such position by the tobacco holders successively indexed into harvesting position and indexed out of such positions for removal of the harvested tobacco plants.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tobacco leaf harvester comprising, frame means, plant guide means mounted forwardly of the frame means, holder means rotatably mounted by the frame means for rotation to indexed positions in alignment with said guide means, spear means removably mounted by the holder means for piercing stalks of plants guided into the holder means by the guide means, plant spacer means movably mounted by the frame means and operative to intermittently shift the plants rearwardly of the holder means along the spear means for loading thereof, index means operatively connected to the holder means periodically rendered effective to rotate said holder means to said indexed positions, and counter means operatively mounted on the frame means for engagement by plant stalks and operatively connected to the index means to render the index means effective in response to engagement of the counter means by a predetermined number of plant stalks.

2. The combination of claim 1, including means mounted on the frame means and engageable with the holder means for displacement of the holder means upwardly in response to rotation thereof after loading of the spear means by said predetermined number of plant stalks.

3. The combination of claim 2, including drive means drivingly connected to the guide means, index means and spacer means to respectively urge plants rearwardly of the frame means and to provide motive power for rotation of the holder means and shifting of the plant stalks rearwardly with respect to the holder means in timed relation to forward movement of the frame means.

4. The combination of claim 3, wherein said spacer means includes a plurality of spaced pivotally mounted fingers engageable with plant stalks on the spear means, linkage means operatively connected to said fingers for simultaneous displacement thereof, and means drivingly connecting the linkage means to the drive means for continuous operation thereof in response to forward movement of the frame means to shift said plant stalks on the spear means in equally spaced relation to each other.

5. The combination of claim 4, wherein said index means includes disengageable clutch means drivingly connecting said drive means to the holder means, release means operatively connected to the linkage means and counter means for holding the clutch means disengaged and operative to permit engagement of the clutch means under control of said counter means.

6. The combination of claim 5 wherein said counter means includes a rotatably mounted counter wheel angularly displaced a predetermined amount by engagement with a plant stalk, stroke limiting means connected to the counter wheel and engageable with the linkage means to define a spacing stroke for the fingers and to define an indexing stroke after a predetermined number of angular displacements of the counter wheel to render the indexing means effective.

7. The combination of claim 1, including drive means drivingly connected to the guide means, index means and spacer means to respectively urge plants rearwardly of the frame means and to provide motive power for rotation of the holder means and shifting of the plant stalks rearwardly with respect to the holder means in timed relation to forward movement of the frame means.

8. The combination of claim 1, wherein said spacer means includes a plurality of spaced pivotally mounted fingers engageable with plant stalks on the spear means, linkage means operatively connected to said fingers for simultaneous displacement thereof, and means drivingly connected to the linkage means for continuous operation thereof in response to forward movement of the frame means to shift said plant stalks on the spear means in equally spaced relation to each other.

9. The combination of claim 8 wherein said counter means includes a rotatably mounted counter wheel angularly displaced a predetermined amount by engagement with a plant stalk, stroke limiting means connected to the counter wheel and engageable with the linkage means to define a spacing stroke for the fingers and to define an indexing stroke after a predetermined number of angular displacements of the counter wheel to render the indexing means effective.

10. The combination of claim 1, wherein said counter means includes a rotatably mounted counter wheel angularly displaced a predetermined amount by engagement with a plant stalk, stroke limiting means mounted on said counter wheel, displacement control means operatively connected to the spacer means and the index means engageable with the stroke limiting means for operation of the spacer means and periodic operation of the index means.

11. The combination of claim 1 wherein said index means comprises intermittent drive means drivingly connected to the holder means for rotation thereof between indexed positions in response to operation of the spacer means, and drive disengaging means operatively connected to the counter means for holding said intermittent drive means disengaged until said predetermined number of plant stalks have been counted.

12. An automatic tobacco harvesting machine comprising, frame means, means for guidingly propelling said frame means to receive plant stalks arranged in a row, spear means displaceably positioned on said frame means for directly impaling said plant stalks in response to said propulsion of the frame means and spacing means operatively mounted on said frame means for continuously displacing said plant stalks impaled on the spear means into equally spaced relation to each other on the spear means in response to propulsion of the frame means.

13. The combination of claim 12, including frame mounted means operatively connected to said spear means and spacing means for displacing said spear means from a stalk impaling position in response to displacement of a predetermined number of plant stalks on the spear means.

14. An automatic tobacco harvesting machine comprising, frame means, means for guidingly propelling said frame means to receive plant stalks arranged in a row, spear means displaceably positioned on said frame means for directly impaling said plant stalks in response to said propulsion of the frame means and frame mounted means operatively connected to said spear means and spacing means for displacing said spear means from a stalk impaling position in response to displacement of a predetermined number of plant stalks on the spear means.

15. The combination of claim 12 wherein said spacing means comprises a plurality of pivotally mounted fingers engageable with plant stalks on the spear means, linkage means operatively connected to said fingers for simultaneously displacement thereof, and means drivingly connected to the linkage means for continuous operation thereof in response to forward movement of the frame means to shift said plant stalks on the spear means in equally spaced relation to each other.

16. The combination of claim 14 wherein said frame mounted means comprises a rotatably mounted counter means angularly displaced a predetermined amount by engagement with a plant stalk for detecting plant stalks to be impaled on the spear means, stroke limiting means mounted on said counter means, intermittent drive means drivingly connected to the spear means for rotation thereof between indexed positions, and drive disengaging means operatively connected to the counter means for holding said intermittent drive means disengaged until said predetermined number of plant stalks have been counted.

References Cited in the file of this patent
UNITED STATES PATENTS

| | | |
|---|---|---|
| 2,813,390 | Irvine | Nov. 19, 1957 |
| 2,836,950 | Anderson | June 3, 1958 |